F. M. DAVIS.
Corn-Planter.
No. 23,357.                                        Patented Mar. 29, 1859.
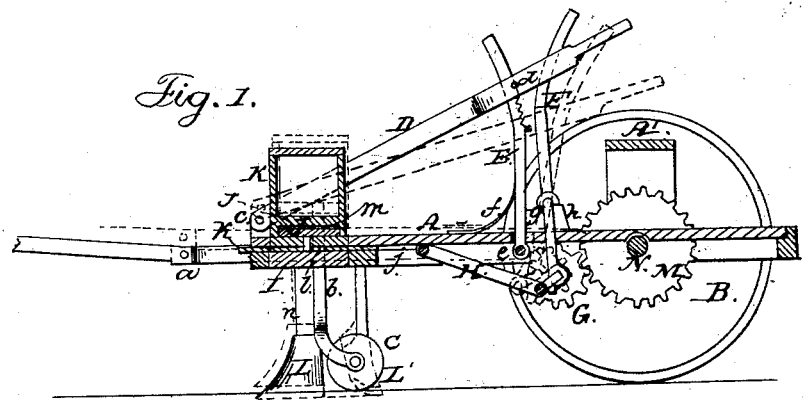
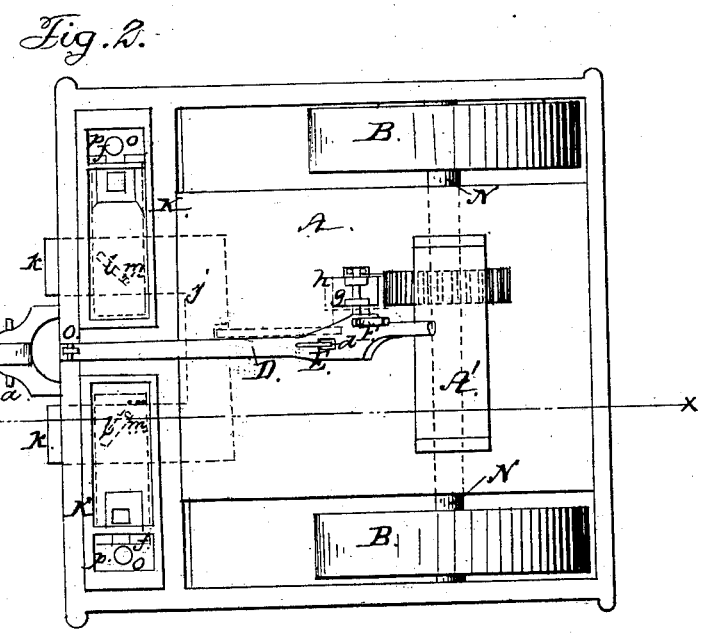
WITNESSES:
INVENTOR:

UNITED STATES PATENT OFFICE.

F. M. DAVIS, OF FOOTVILLE, WISCONSIN.

IMPROVEMENT IN SEEDING-MACHINES.

Specification forming part of Letters Patent No. 23,357, dated March 29, 1859.

*To all whom it may concern:*

Be it known that I, F. M. DAVIS, of Footville, in the county of Rock and State of Wisconsin, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x\,x$, Fig. 2. Fig. 2 is a plan or top view of the same; Fig. 3, a detached plan or top view of one of the seed-slides and the slotted bar that operates it.

Similar letters of reference indicate corresponding parts in the several figures.

To enable those skilled in the art to fully understand and construct my invention, I will proceed to describe it.

A represents a rectangular platform, which is mounted on wheels B B, and has a draft-pole, B', attached at one end by a pin or bolt, $a$. The front end of the platform is supported by a caster-wheel, C, the rod $b$ of which passes through the front part of the platform and bears against the under side of a lever, D, which is secured by a fulcrum-pin, $c$, to the front part of the platform, the back or inner end of the lever being secured at the desired height by means of a curved rack, E, attached to the platform and passing through a mortise in the lever D, a pin, $d$, passing transversely through said mortise, serving as a catch. The rack E is attached to the platform A by a joint, $e$, and a spring, $f$, bears against the rack E, serving to keep it in connection with the pin $d$. (See Fig. 1.)

F is a curved bar, which is attached by a fulcrum pin or rod, $g$, to a ledge, $h$, on the platform A. The lower part of this bar F extends below the platform A, and has a pinion, G, fitted in it, said pinion having a crank, $i$, at one end of its shaft.

H is a connecting-rod, one end of which is attached to the crank $i$, the opposite end being attached to a transverse bar, $j$, which has two slides, $k\,k$, attached to it, one at each end. The slides $k\,k$ are parallel with each other, and they are fitted and work between the front end of the platform A and a board, I, attached to the under side of the platform. Each slide $k$ has an oblique slot, $l$, made in it, and a pin, $m$, fits in each slot $l$, said pins being attached to seed-slides J J, which work in the bottoms of seed-boxes K K. The seed-slides J are perforated and arranged in the ordinary way.

To the under side of the platform A, at its front part and at each side, a furrow-share, L, is attached, said shares being attached to the lower ends of tubes $n$, which communicate with holes $o$ in the bottoms of chambers $p$ adjoining the seed-boxes. The upper end of the bar F passes through a mortise in the lever D. The pinion G, when the seed-distributing device is in operation, gears into a wheel, M, on the axle N of the wheels B B.

The operation is as follows: When the machine is drawn along a reciprocating motion is given the slides $k\,k$ through the medium of the crank $i$ and connecting-rod H, and the oblique slots $l$ in the slides $k$ give a reciprocating motion to the seed-slides J, which distribute the seed from the boxes K in the usual way, or in a way similar to most reciprocating seed-slides. When it is desired to stop the seed-distributing device, the driver, from his seat A', throws back by his foot the rack E, and then depresses the lever D. This pushing down of the lever D throws back the bar F, and consequently the pinion G forward and out of gear with the wheel M, so that the slides $k\,k$, and consequently the slides J J, will be inoperative. At the same time the lever D, bearing on the top of the rod $b$, will as it is depressed raise the front end of the platform A, and consequently the shares L, so that the latter may be elevated free from the ground and the machine drawn along from place to place, the same as any ordinary vehicle. (See red lines, Fig. 1.) The shares also may be adjusted as desired, higher or lower, to make furrows of greater or less depth, by regulating the position of lever D, the teeth of the gearing G M being sufficiently long to admit of such adjustment without throwing said parts out of gear. The usual covering-shares, L', are employed.

I am aware that reciprocating seed-slides J have been previously used, and also that slides $k$, with oblique slots $l$, have been used for operating seed-slides. I therefore do not claim the reciprocating seed-slides, nor the slides $k$; but,

Having thus described my invention, what I claim as new, and desire to secure by Letters Patent, is—

The arrangement and combination of the caster-wheel C, lever D, spring rack-bar E, pinion-bar F, pinion G, rod H, slides k, and share L, as herein shown and described, so that when the bar E is thrown back and lever D is depressed the bar F will carry the pinion out of gear with wheel M, and thus render the seed-slides k inoperative, while the front part of the machine will be lifted on the caster-wheel and the shares L raised out of the ground, all as set forth.

F. M. DAVIS.

Witnesses:
S. W. D. PARKER,
R. B. TREAT.